US011873832B2

(12) United States Patent
Wrage et al.

(10) Patent No.: US 11,873,832 B2
(45) Date of Patent: Jan. 16, 2024

(54) ONE PIECE CASTING FAN HUB

(71) Applicant: Caterpillar Inc., Peoria, IL (US)

(72) Inventors: Bradley P. Wrage, Pekin, IL (US); Dongming Tan, Dunlap, IL (US); Adam C. Grove, Washington, IL (US); Neil A. Terry, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/663,271

(22) Filed: May 13, 2022

(65) Prior Publication Data

US 2022/0268295 A1 Aug. 25, 2022

Related U.S. Application Data

(62) Division of application No. 16/989,096, filed on Aug. 10, 2020, now Pat. No. 11,346,361.

(51) Int. Cl.
*F04D 29/36* (2006.01)
*F04D 29/32* (2006.01)
*F01D 5/30* (2006.01)

(52) U.S. Cl.
CPC ............. *F04D 29/329* (2013.01); *F01D 5/30* (2013.01); *F05D 2230/10* (2013.01); *F05D 2230/21* (2013.01)

(58) Field of Classification Search
CPC .... F04D 29/329; F04D 29/181; F04D 19/322; F04D 29/325; F04D 29/326; F04D 29/34; F04D 25/088; F01D 5/30; F05D 2230/10; F05D 2230/21; F05D 2230/24
See application file for complete search history.

(56) References Cited

U.S. PATENT DOCUMENTS

| | | | | |
|---|---|---|---|---|
| 4,957,414 | A | 9/1990 | Willingham | |
| 5,520,515 | A | 5/1996 | Bailey | |
| 5,997,010 | A | 12/1999 | Loyd | |
| 6,244,821 | B1 * | 6/2001 | Boyd | F24F 7/007 416/223 R |
| 6,817,835 | B2 | 11/2004 | Boyd | |
| 7,955,055 | B1 | 6/2011 | Boyd | |
| 8,721,305 | B2 | 5/2014 | Oleson | |
| 2004/0101407 | A1 | 5/2004 | Pennington | |

(Continued)

FOREIGN PATENT DOCUMENTS

| | | | |
|---|---|---|---|
| CN | 200978831 | Y | 11/2007 |
| CN | 208702758 | U | 4/2019 |
| CN | 212909160 | U * | 4/2021 |

OTHER PUBLICATIONS

English translation of CN212909160 (Year: 2021).*

*Primary Examiner* — Jun S Yoo
(74) *Attorney, Agent, or Firm* — Leydig, Voit & Mayer, Ltd

(57) ABSTRACT

A hub assembly for construction of a fan includes a hub plate having a front face, a rear face, and an annular surface extending between the front face and the rear face. The hub plate defines a hub assembly axis extending through the front face and the rear face which is configured to coincide with the fan axis. The hub assembly further includes a plurality of elongated root sections that are circumferentially spaced apart and extend radially from the annular surface. The elongated root sections have a substantially circular cross-section. The hub plate and the plurality of elongated spokes are unitarily formed.

20 Claims, 3 Drawing Sheets

(56) References Cited

U.S. PATENT DOCUMENTS

| | | | |
|---|---|---|---|
| 2008/0031726 | A1 | 2/2008 | Bernardus |
| 2009/0208333 | A1 | 8/2009 | Smith |
| 2010/0278637 | A1 | 11/2010 | Oleson |
| 2013/0189104 | A1 | 7/2013 | Hollan |
| 2019/0072097 | A1* | 3/2019 | Horng .................. F04D 29/388 |

* cited by examiner

ONE PIECE CASTING FAN HUB

CROSS-REFERENCE TO RELATED APPLICATIONS

This patent application is a divisional of and claims the benefit of priority to U.S. Non-provisional patent application Ser. No. 16/989,096, filed Aug. 10, 2020, the entirety of which is incorporated herein by reference.

TECHNICAL FIELD

This patent disclosure relates generally to fans and, more particularly to fan hubs and methods of manufacturing fans.

BACKGROUND

Fans can be complex structures with many components requiring assembly. Fans generally include a hub from which a plurality of fan blades extend. In use, a rotational input is provided to the hub by way of an adapter or bushing. Hub designs in particular may be complex structures including many machined surfaces and bolted joints. Moreover, as fans are utilized in a variety of applications requiring different coupling arrangements and blade angles, a large inventory of components may be required to meet the needs of various fan designs.

Fan designs are ideally constructed to avoid reaching resonance through normal operating speeds. Further, fan designs should avoid bending or waving through normal operating speeds. The challenges involved in manufacture and assembly of fans may be magnified in the production of large or heavy-duty fans. While large fan designs require sufficient stiffness and strength to withstand forces applied during use, they are nonetheless subject to weight restrictions and cost limitations.

Chinese Utility Model CN200978831 discloses a cast aluminum fan hub that includes a central shaft sleeve 5 surrounded by a hub plate 4 with a hub ring 3. A plurality of blade mounting sheets 1 extend from the hub ring. Fan blades 7 are then mounted to the blade mounting sheets with bolts 6.

SUMMARY

The disclosure describes in one aspect, a hub assembly for construction of a fan including a plurality of fan blades, the fan being configured to rotate about a fan axis. The hub assembly includes a hub plate having a front face, a rear face, and an annular surface extending between the front face and the rear face. The hub plate defines a hub assembly axis, which extends through the front face and the rear face and which is configured to coincide with the fan axis. The hub assembly further includes a plurality of elongated root sections that are circumferentially spaced apart and extend radially from the annular surface. The elongated root sections have a substantially circular cross-section. The hub plate and the plurality of elongated spokes are unitarily formed.

The disclosure describes in another aspect, a method of manufacturing a fan configured to rotate about a fan axis. The method includes forming a unitary hub assembly including a substantially circular hub plate and a plurality of circumferentially spaced apart elongated root sections extending radially from the hub plate. The method further includes machining the plurality of elongated root sections to form respective radially extending root mounting surfaces, and respectively coupling a plurality of fan blades to the respective radially extending root mounting surfaces.

The disclosure described in yet another aspect a method of manufacturing a customized fan configured to rotate about a fan axis. The method includes providing a unitary hub assembly including a substantially circular hub plate and a plurality of elongated root sections extending radially from the hub plate, the elongated root sections having a substantially circular cross-section. The method further includes providing a selected plurality of fan blades. The method further includes machining the plurality of elongated root sections to form respective radially extending root mounting surfaces disposed at a desired cord angle, and respectively coupling the selected plurality of fan blades to the respective radially extending root mounting surfaces. The method further includes machining an axial bore along a hub assembly axis of the unitary hub assembly, pressing a selected bushing including a central mounting hole into the axial bore, and securing the bushing in the axial bore. According to the method, the selected plurality of fan blades, the cord angle of the radially extending root mounting surfaces, and the selected bushing determine operating characteristics of the customized fan.

BRIEF DESCRIPTION OF THE DRAWING(S)

DETAILED DESCRIPTION

Figure 1:
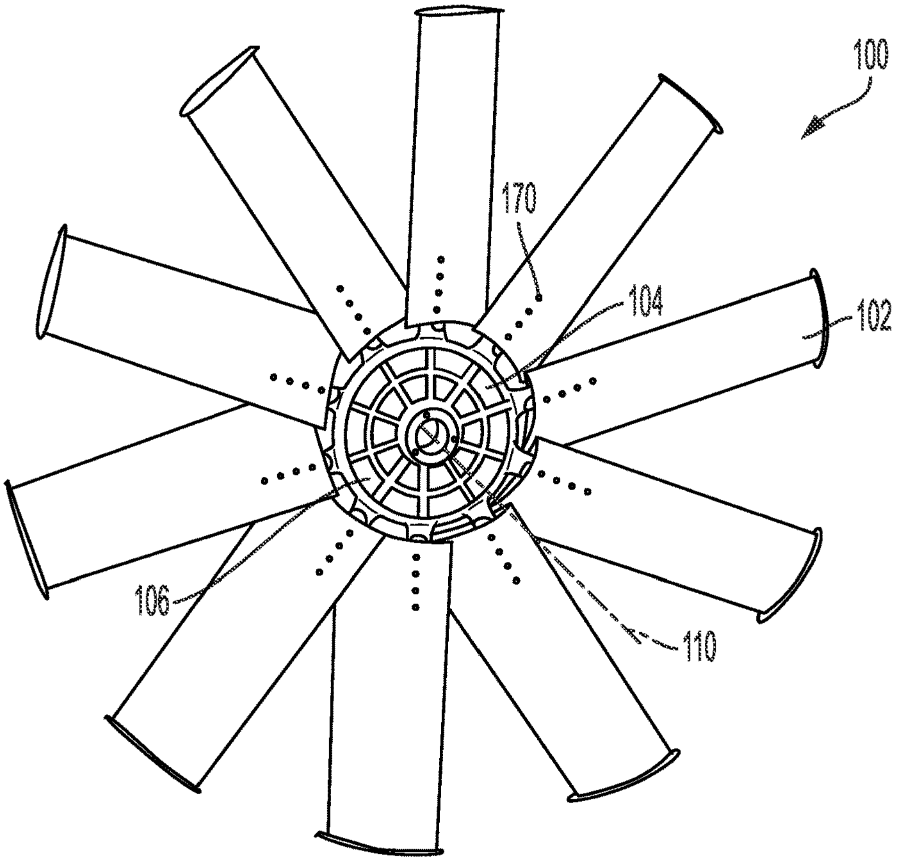
FIG. 1 is an isometric view of an exemplary fan according to teachings of this disclosure.

This disclosure relates to fans, and more particularly to an arrangement and method for customizing a fan 100 as required for a particular application. Referring to FIG. 1, there is illustrated a fan 100 including a plurality of fan blades 102 coupled to a fan hub assembly 104. As shown most clearly in FIG. 2, the hub assembly 104 includes a hub plate 106 from which a plurality of elongated root sections 108 extend. The elongated root sections 108 are circumferentially spaced apart and extend generally radially from the hub plate 106. A fan blade 102 is mounted to each of the elongated root sections 108 to form the fan 100. The hub plate 106 defines a hub assembly axis 110 which, in use, coincides with a fan axis. That is, the fan 100 may be mounted to rotate about the fan axis as defined by the hub assembly axis 110.

In accordance with an aspect of this disclosure, the hub assembly 104 is a unitary structure. While the hub assembly 104 may be fabricated by any appropriate method and of any appropriate material providing adequate strength and stability, in at least one embodiment, the hub assembly 104 is cast from a metal, such as aluminum, or a metal alloy. Those of skill in the art will appreciate, however, that alternative fabrication methods may be utilized, such as, for example, 3D printing.

Figure 3:
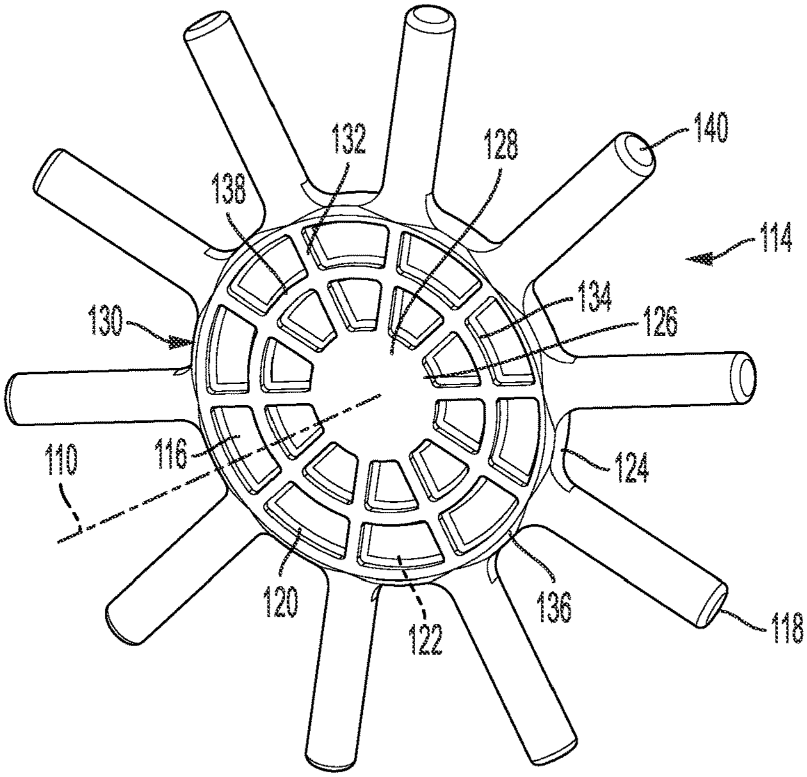
FIG. 3 is an isometric view of a fan hub casting according to teachings of this disclosure.

According to another aspect of this disclosure, the hub assembly 104 may be utilized in the construction of a plurality of fan sizes and designs. To this end, the hub assembly 104 is formed as universal hub casting 114, such as is illustrated in FIG. 3. The hub casting 114 is a generally planar structure that includes a cast hub plate 116 from which a plurality of cast elongated root sections 118 radially extend. As utilized in this disclosure, the terms "hub casting 114," "cast hub plate 116," and "cast elongated root sections 118" are indicative of respective structures, fabricated by casting, 3D printing, or other appropriate fabrication method, that may be machined to form a hub assembly 104 that may be utilized in a plurality of fan sizes and/or designs. For the purposes of this disclosure, the finished hub assembly, hub plate, and elongated root sections are identified as reference numbers 104, 106, and 108, respectively, while the hub casting, and the hub plate and elongated root sections of the hub casting are identified as 114, 116, and 118, respectively. That is, finished element are referenced as 10X numbers, while the in process elements are referenced as 11X numbers.

The cast hub plate 116 is a substantially circular structure including a front face 120 and a rear face 122 between which a substantially annular surface 124 extends. In order to enhance the strength of the cast hub plate 116 without significantly increasing weight, the cast hub plate 116 may include a thickened area 126 adjacent the hub assembly axis 110. In the illustrated embodiment, for example, the thickened area 126 includes a raised reinforcement 128 along the front and/or rear faces 120, 122 of the cast hub plate 116.

Similarly, in order to enhance the strength of the cast hub plate 116 without significantly increasing weight, the cast hub plate 116 may include a plurality of reinforcing ribs 130. While the reinforcing ribs 130 may be of any appropriate design, in the illustrated embodiment, the reinforcing ribs 130 may include a plurality of radially disposed ribs 132 along the front and/or rear face 120, 122. At least a portion of the radially disposed ribs 132 may be disposed to coincide with the radially projections of the elongated root sections 118. In the illustrated embodiment, for example, a radially disposed rib 132 is provided to coincide with the radial projections of each of the elongated root sections 118.

The reinforcing ribs 130 may additionally or alternatively include one or more annular ribs 134 disposed along the front and/or rear face 120, 122. The illustrated cast hub plate 116, for example includes a pair of annular ribs 134. A first annular rib 136 is disposed along the front and/or rear face 120, 122 substantially adjacent the annular surface 124 of the cast hub plate 116. In this way, the first annular rib 136 may provide additional strength and reinforcement for support of the elongated root sections 118. In the illustrated embodiment, a second annular rib 138 is disposed along the front and/or rear face 120, 122 between the first annular rib 136 and the thickened area 126 or raised reinforcement 128 adjacent the hub assembly axis 110.

Figure 4:
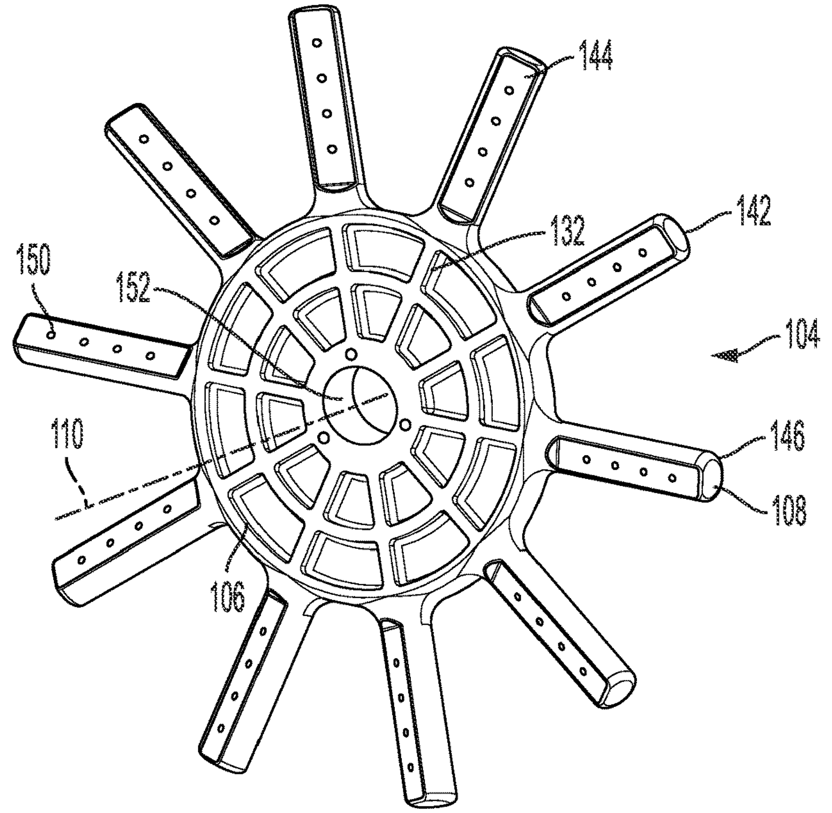
FIG. 4 is a front, isometric view of the fan hub assembly of FIGS. 1-3.
Figure 5:
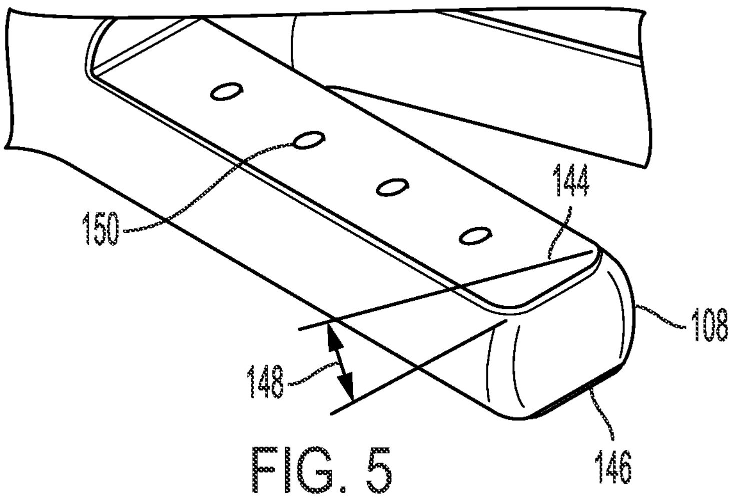
FIG. 5 is an enlarged fragmentary view of an exemplary root section of the fan hub assembly of FIGS. 1-4.
Figure 6:
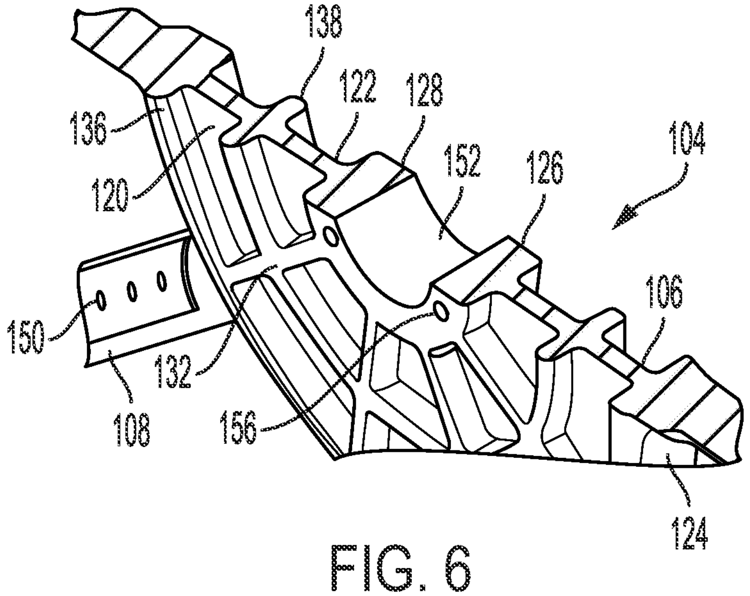
FIG. 6 is a fragmentary, isometric, cross-sectional view of the fan hub assembly of FIGS. 1-5.

In order to facilitate the use of the hub casting 114 in the fabrication of a plurality of fan sizes and designs, the cast elongated root sections 118 have a thickened cross-section 140. In this way, the cast elongated root sections 118 may be machined to provide a desired cross-section 142 appropriate for mounting of fan blades 102 to provide an easily customizable fan design. In the illustrated embodiment, for example, the cast elongated root sections 118 have a substantially circular cross-section 140. As illustrated in FIG. 4 and the enlarged fragmentary view of FIG. 5, the cast elongated root sections 118 may be machined to provide an elongated root section 108 having one or more radially extending root mounting surfaces 144, 146. The radially extending root mounting surfaces 144, 146 may be configured to provide a desired chord angle 148 for mounting of a fan blade 102 configured to provide a customized fan design. For the purposes of this disclosure, the chord angle 148 is the angle between the generally planar surface of the hub casting 114 and the radially extending root mounting surface 144, 146. It will thus be appreciated that the chord angle 148 may be used to define a pitch of a blade mounted to the elongated root section 108.

In order to facilitate coupling of fan blades 102 to the finished elongated root sections 108, the cast root sections 118 may further be machined to facilitate coupling of fan blades 102 to the finished elongated root sections 108. In the illustrated embodiment, for example, one or more root section bores 150 may be drilled into the elongated root sections 118. It will be appreciated, however, that alternative arrangements may be provided for coupling the fan blades 102 to the elongated root sections 108.

Figure 2:
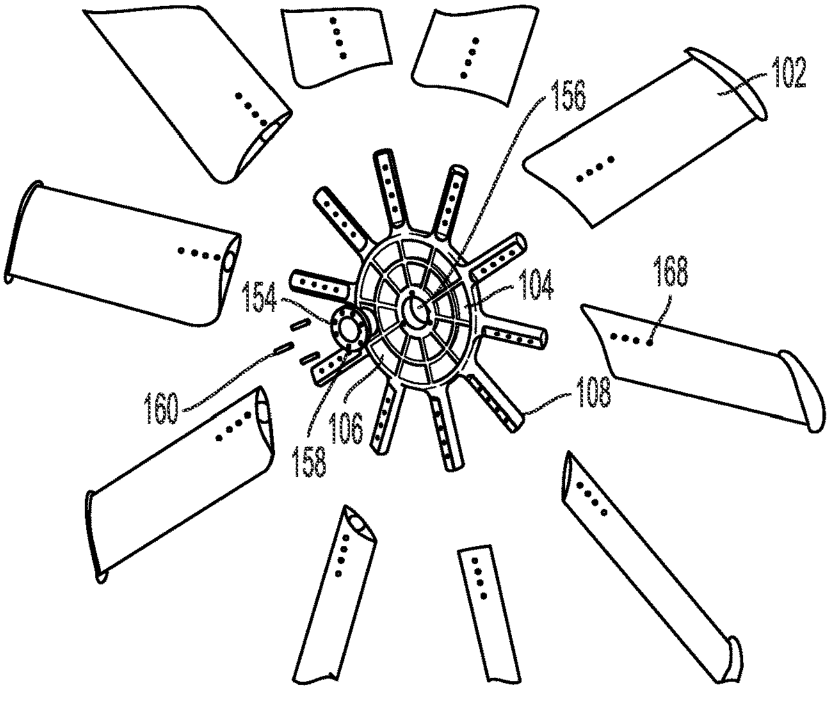
FIG. 2 is a fragmentary, exploded view of the fan of FIG. 1.

In order to further facilitate the use of the hub casting 114 in the fabrication of a plurality of fan sizes, designs, and applications, the cast hub plate 116 of the hub casting 114 may be machined to permit coupling of the fan 100 to a given driving element, such as a motor (not shown). In this way, the cast hub plate 116 may be machined to include an axial bore 152 along the hub assembly axis 110. The axial bore 152 may be configured to fit a bushing 154 (FIG. 2) which may be pressed into the axial bore 152 for mounting the fan to a driving element or the like. It will be appreciated that the bushing 154 may be of a standard size configured to engagement with the driving element or the like. To further secure the bushing 154 with the hub plate 106, the cast hub plate 116 may be machined to provide a plurality of plate bores 156 about the axial bore 152. As illustrated in FIG. 2, the plurality of plate bores 156 may be drilled to coincide with a plurality of bushing bores 158 such that fasteners 160 may be advanced through the bushing bores 158 and secured within the plate bores 156. It will be appreciated that the fasteners 160 may be of any appropriate design. By way of example, the fasteners 160 may be bolts, rivets, or the like.

Figure 7:
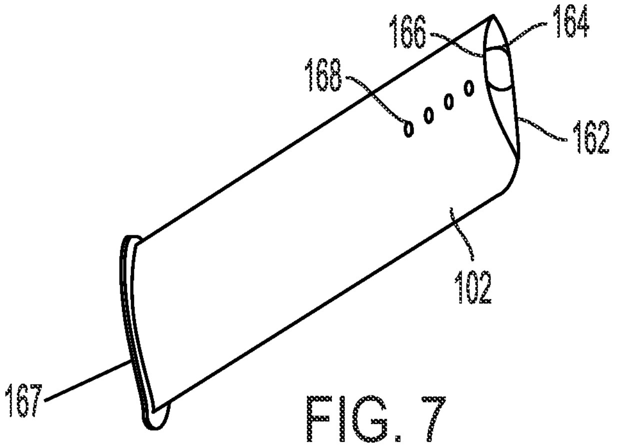
FIG. 7 is an isometric view of an exemplary fan blade of the fan of FIG. 1.

The fan blades 102 may be of any appropriate design, and may be fabricated by any appropriate manner of manufacture, such as molding or extruding. Referring to FIG. 7, by way of example only, the fan blades 102 may have an elongated, relatively flattened structure. It will be appreciated that the chord angle 148 of the root mounting surfaces 144, 146 largely determines the angle of the fan blade 102 when coupled to the elongated root section 108. The fan blades 102 may be coupled to the elongated root sections 108 in any appropriate manner. In the illustrated embodiment, for example, the fan blades 102 include an outer shell 162 defining the outer surfaces of the fan blade 102. The fan blade 102 further includes an elongated longitudinally-extending blade bore 164. The longitudinally-extending blade bore 164 includes at least one blade mounting surface 166 configured to conform to at least one of the respective radially extending root mounting surfaces 144, 146 of the plurality of elongated root sections 108. In the illustrated embodiment, the elongated longitudinally-extending blade bore 164 closely conforms to the machined elongated root section 108 such that the fan blade 102 includes a plurality of blade mounting surfaces 166 (i.e., the cross-section of the root section 108 substantially corresponds to the shape of the longitudinally-extending blade bore 164). While the illustrated blade mounting surfaces 166 are disposed within the interior of the illustrated embodiment, those of skill in the art will appreciate that a blade mounting surface may be disposed along an exterior surface of the fan blade in alternative embodiments. In other words, rather than utilize a blade bore 164 that extends longitudinally through the interior of the fan blade 102, the fan blade 102 may include a mounting surface (not shown) along an outer surface of the blade configured to engage a root mounting surface such as depicted at 144 or 146.

It will be appreciated that a fan blade 102 may further include an endcap 167. While the endcap 167 may be integrally formed with the outer shell 162, alternatively, the endcap 167 may be coupled to the outer shell 162 by any appropriate arrangement. For example, in the case of an extruded outer shell 162, a separately formed endcap 167 may engage with the longitudinally-extending blade bore 164 or an end of the outer shell 162.

In order to further secure the fan blades 102 to the elongated root sections 108, the fan blades 102 may further include a plurality of blade bores 168. The root section bores 150 may be configured for disposition in line with the blade bores 168. It will thus be appreciated that an inventory of fan blades 102 of preset, standardized sizes, e.g., lengths and widths, having predrilled blade bores 168 may be maintained in order to construct various fan designs. The elongated root sections 108 of the fan hub assembly 104 may be machined to include root section bores 150 that are configured for disposition in line with the blade bores 168. In this way, the cast hub plate 116 may be further customized for a given application. Fasteners 170 may be advanced through the blade bores 168 and secured within the root section bores 150. It will be appreciated that the fasteners 170 may be of any appropriate design. By way of example, the fasteners 170 may be bolts, rivets, or the like.

INDUSTRIAL APPLICABILITY

Some embodiments of the unitary hub casting 114 may provide flexibility in facilitating the manufacture of customized fan designs. For example, some embodiments facilitate the use of fan blades 102 of a desired size, as well as disposition of the fan blades 102 at a desired chord angle 148 for a given application.

Some embodiments may minimize the number of components required for assembly of a fan 100. For example, some embodiments may facilitate the use of standardized elements, such as standardized bushings 154, and/or standardized fan blade 102 designs.

Some embodiments may provide certain economic advantages, including economic advantages in the manufacture of the fan 100 as well as economic advantages in inventory costs. Some embodiments of the unitary hub casting 114 may be economically manufactured, while allowing for flexibility in the design of a resulting fan 100. Some embodiments of the fan hub assembly 104 and the resulting fan 100 may provide adequate stiffness and strength to a fan 100 at a reasonable cost.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A fan assembly configured to rotate about a fan axis, the fan assembly comprising:

- a unitary hub member, the unitary hub member including:
  - a hub plate, the hub plate having a front face, a rear face, and an annular surface extending between the front face and the rear face, the hub plate having a bore extending through the front face and the rear face, the bore defining a hub member axis configured to coincide with the fan axis,
  - a plurality of elongated root sections extending radially from and being circumferentially spaced apart on the annular surface of the hub plate, each elongated root section having a substantially circular cross-section, each cross-section having a pair of curved surfaces and a pair of spaced apart machined blade mounting surfaces connecting the pair of curved surfaces to define a machined root section, the blade mounting surfaces extending lengthwise of the root section, the pair of curved surfaces having an identical radii and extending about a common center point, and at least one of the machined blade mounting surfaces of each machined root section having a plurality of bores extending therethrough, and
  - wherein the hub plate and the plurality of elongated root sections are unitarily formed; and
- a plurality of fan blades, each fan blade having a blade bore, each machined root section being disposed within a corresponding blade bore and each fan blade engaging at least one of the machined blade mounting surfaces of each machined root section, whereby one of the fan blades is mounted on each of the machined blade mounting surfaces.

2. The fan assembly of claim 1 wherein the curved surfaces face in first opposite directions and the machined blade mounting surfaces further face in second opposite directions.

3. The fan assembly of claim 1 wherein each blade bore and each machined root section have corresponding cross-sectional shapes.

4. The fan assembly of claim 1 wherein the curved surfaces face in opposite directions.

5. The fan assembly of claim 1 wherein the hub plate includes a thickened area adjacent the hub member axis.

6. The fan assembly of claim 5 wherein the thickened area includes a raised reinforcement rib along at least one of the front face and the rear face.

7. The fan assembly of claim 1 wherein the front face and the rear face each include a plurality of reinforcing ribs.

8. The fan assembly of claim 7 wherein the plurality of reinforcing ribs includes a plurality of radially disposed ribs extending from the hub member axis that are aligned with the plurality of elongated root sections.

9. The fan assembly of claim 7 wherein the plurality of reinforcing ribs include a plurality of annular ribs disposed about the hub member axis.

10. The fan assembly of claim 1 wherein the hub plate and plurality of elongated root sections are a unitary casting.

11. A fan assembly configured to rotate about a fan axis, the fan assembly comprising:

a unitary hub member, the unitary hub member including:

a hub plate, the hub plate having a front face, a rear face, and an annular surface extending between the front face and the rear face, the hub plate having a bore extending through the front face and the rear face, the bore defining a hub member axis configured to coincide with the fan axis, wherein there is a thickened area adjacent the hub member axis on the hub plate, a plurality of elongated root sections extending radially from and being circumferentially spaced apart on the annular surface of the hub plate, each elongated root section having a substantially circular cross-section, each cross-section having a pair of curved surfaces and a pair of spaced apart machined blade mounting surfaces connecting the pair of curved surfaces to define a machined root section, the blade mounting surfaces extending lengthwise of the root section, the pair of curved surfaces having an identical radii and extending about a common center point, and at least one of the machined blade mounting surfaces of each machined root section having a plurality of bores extending therethrough, and wherein the hub plate and the plurality of elongated root sections are unitarily formed; and a plurality of fan blades, each fan blade engaging one of the machined blade mounting surfaces, whereby one of the fan blades is mounted on each of the machined blade mounting surfaces.

12. The fan assembly of claim 11 wherein the curved surfaces face in first opposite directions and the machined blade mounting surfaces further face in second opposite directions.

13. The fan assembly of claim 11 wherein the curved surfaces face in opposite directions.

14. The fan assembly of claim 11 wherein the thickened area includes a raised reinforcement rib along at least one of the front face and the rear face.

15. The fan assembly of claim 11 wherein the front face and the rear face each include a plurality of reinforcing ribs.

16. A fan assembly configured to rotate about a fan axis, the fan assembly comprising:

a unitary hub member, the unitary hub member including:

a hub plate, the hub plate having a front face, a rear face, and an annular surface extending between the front face and the rear face, the hub plate having a bore extending through the front face and the rear face, the bore defining a hub member axis configured to coincide with the fan axis, a plurality of elongated root sections extending radially from and being circumferentially spaced apart on the annular surface of the hub plate, each elongated root section having a substantially circular cross-section, each cross-section having a pair of curved surfaces and a pair of spaced apart machined blade mounting surfaces connecting the pair of curved surfaces to define a machined root section, the blade mounting surfaces extending lengthwise of the root section, the pair of curved surfaces having an identical radii and extending about a common center point, and at least one of the machined blade mounting surfaces of each machined root section having a plurality of bores extending therethrough, and wherein the hub plate and the plurality of elongated root sections are unitarily formed; and a plurality of fan blades, each fan blade engaging one of the machined blade mounting surfaces, whereby one of the fan blades is mounted on each of the machined blade mounting surfaces.

17. The fan assembly of claim 16 wherein the front face and the rear face each include a plurality of reinforcing ribs.

18. The fan assembly of claim 17 wherein the plurality of reinforcing ribs includes a plurality of radially disposed ribs extending from the hub member axis that are aligned with the plurality of elongated root sections.

19. The fan assembly of claim 17 wherein the plurality of reinforcing ribs include a plurality of annular ribs disposed about the hub member axis.

20. The fan assembly of claim 16 wherein the hub plate and plurality of elongated root sections are a unitary casting.

* * * * *